United States Patent [19]

Hoffmann et al.

[11] 3,708,718

[45] Jan. 2, 1973

[54] ELECTRICAL SWITCHING DEVICE

[75] Inventors: Manfred Hoffmann, Erlangen; Kurt Fork, Mulheim-Ruhr; Peter Schulze, Erlangen, all of Germany

[73] Assignee: Siemens Aktiengesellschaft, Berlin and Munich, Germany

[22] Filed: Oct. 13, 1970

[21] Appl. No.: 80,329

[30] Foreign Application Priority Data

May 15, 1970 Germany....................P 20 23 872.6

[52] U.S. Cl.............317/11 B, 317/DIG. 6, 307/136
[51] Int. Cl...........................H01h 9/30, H01h 33/04
[58] Field of Search.........317/11 B, DIG. 6; 307/136

[56] References Cited

UNITED STATES PATENTS

| | | | |
|---|---|---|---|
| 2,789,253 | 4/1957 | Vang | 317/11 B |
| 3,309,570 | 3/1967 | Goldberg | 317/11 B |
| 3,475,620 | 10/1969 | Murray et al. | 317/11 B |

*Primary Examiner*—L. T. Hix
*Attorney*—Curt M. Avery, Arthur E. Wilfond, Herbert L. Lerner and Daniel J. Tick

[57] ABSTRACT

An electronic switch is connected in series circuit arrangement with a capacitor. The series circuit arrangement is connected in parallel with a vacuum switch. A control circuit coupled between the vacuum switch and the electronic switch controls the electronic switch in conductive condition in a manner whereby the electronic switch is switched to its conductive condition immediately after the contacts of the vacuum switch are opened thereby providing a current path from the capacitor to the vacuum switch via the electronic switch.

6 Claims, 2 Drawing Figures

ELECTRICAL SWITCHING DEVICE

DESCRIPTION OF THE INVENTION

Figure 1:
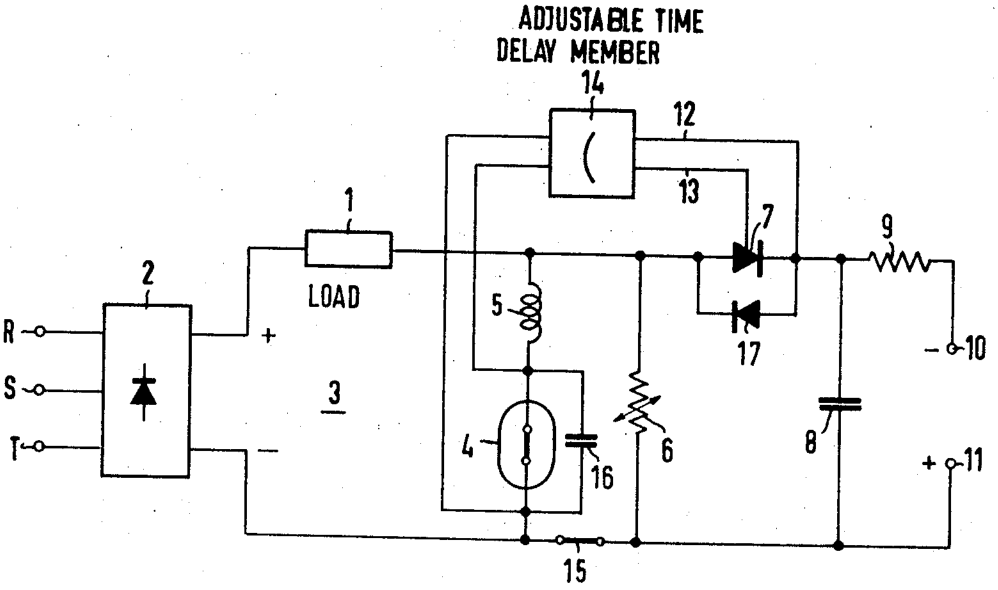

The invention relates to an electrical switching device. More particularly, the invention relates to an electrical switching device having a vacuum switch.

During the interruption of circuits which are highly charged at a high switching speed by a vacuum switch, many problems occur. The zero passage of the current at the contacts of the vacuum switch, and thus the extinguishing of the arc, must be attained by force. This requires that the switching path have dielectric strength after the interruption of the arc. That is, for example, it is required that there be no renewed firing of the arc during the half wave following the interruption of the arc. Furthermore, it is necessary that excessively long burning of the arc be avoided, since the considerable heating, which may result in vaporization of the contact material, may damage the vacuum switch and may necessitate expensive repairs. When circuits, especially DC circuits, are interrupted by inductive charges, overvoltages occur in accordance with the magnitude of the extinguishing current.

The principal object of the invention is to provide a new and improved electrical switching device.

An object of the invention is to provide an electrical switching device which is suitable for operation at a high switching speed and which has high switching capacity.

An object of the invention is to provide an electrical switching device in which zero passage of the current is provided at the switch contacts of the vacuum switch at an exactly defined time.

An object of the invention is to provide an electrical switching device in which the interruption of the arc of the vacuum switch is provided for a specified time when the switching path has disruptive strength and when there is little likelihood of damage to the vacuum switch.

An object of the invention is to provide an electrical switching device in which the switching cycle is optimized and completed within a minimum period of time.

An object of the invention is to provide an electrical switching device in which excessive voltages occurring during inductive charging are avoided in a simple manner.

An object of the invention is to provide an electrical switching device which functions as a high speed circuit breaker and which is of simple structure and of few, light weight components.

An object of the invention is to provide an electrical switching device which has few mechanically moving parts, which are of light weight and which permit high speed operation with small likelihood of mechanical stresses.

An object of the invention is to provide an electrical switching device which is without noise and which attains high switching frequencies.

An object of the invention is to provide an electrical switching device which permits the connection of high voltage, since the vacuum switch is relieved of switching off operations.

An object of the invention is to provide an electrical switching device which may interrupt currents of several kiloamperes in a few milliseconds.

An object of the invention is to provide an electrical switching device which is of simple structure and functions with efficiency, effectiveness and reliability.

In accordance with the invention, an electrical switching device comprises a vacuum switch having contacts. Current means supplies a current. Control means coupled between the vacuum switch and the current means connects the current means to the vacuum switch immediately after the contacts of the vacuum switch are opened to supply current to the vacuum switch in a direction opposite the current conducted by the vacuum switch thereby counteracting overvoltage due to interruption of the arc in the vacuum switch.

In accordance with the invention, an electronic switch is connected in series circuit arrangement with a capacitor and the series circuit arrangement is connected in parallel with the vacuum switch. Control means coupled between the vacuum switch and the electronic switch controls the electronic switch in conductive condition in a manner whereby the electronic switch is switched to its conductive condition immediately after the contacts of the vacuum switch are opened thereby providing a current path from the capacitor to the vacuum switch via the electronic switch.

The electronic switch comprises a controlled rectifier which is fired by the voltage occurring at the contacts of the vacuum switch when the contacts are opened. The vacuum switch may have auxiliary contacts, in which case the controlled rectifier is fired by the voltage occurring at the auxiliary contacts of the vacuum switch when its contacts are opened.

The electronic switch comprises a controlled rectifier having a control electrode. The control means comprises delay means and electrically conductive means connecting the contacts of the vacuum switch to the control electrode of the controlled rectifier via the delay means.

A non-linear resistor is connected in parallel with the series circuit arrangement. An auxiliary switch is interposed between the vacuum switch and the series circuit arrangement and the non-linear resistor for selectively disconnecting the series circuit arrangement and the non-linear resistor from the vacuum switch. A surge diverter may be connected in parallel with the series circuit arrangement instead of the non-linear resistor.

An inductance is connected in series with the vacuum switch. Another capacitor is connected in shunt with the vacuum switch. A rectifier may be connected in antiparallel with the controlled rectifier. A source of direct voltage is connected to the series circuit arrangement for recharging the capacitor.

The zero passage of the current is provided at the switching contacts of the vacuum switch at a specifically defined time, due to the supply by the capacitor of a current which is of opposite direction to that of said vacuum switch. That is, the current supplied to the vacuum switch by the capacitor is opposite in direction to the arc current of said vacuum switch. The capacitor supplies such current when the controlled rectifier is fired due to the opening of the contacts of the vacuum switch.

If the non-linear resistor is included in the electrical switching device or high speed circuit breaker of the invention, the charging current is commutated to said resistor during the firing of the controlled rectifier. In this manner, excessive voltages occurring during inductive charging are avoided in a simple manner. Additionally, a variation of the non-linear resistor permits the adjustment of variable counter-voltages. The auxiliary switch is utilized to switch off the residual current via the non-linear resistor.

The inductance or choke winding connected in series with the vacuum switch functions to interrupt the alternating current. Furthermore, during the firing of the controlled rectifier, the polarity of the circuit to be disconnected and the charging voltage of the capacitor are not in opposition, the zero passage of the current is controlled by the rectifier connected in antiparallel with the controlled rectifier, during the return portion of the cycle of the current in the oscillating circuit which comprises the inductance and the capacitor.

Figure 2:
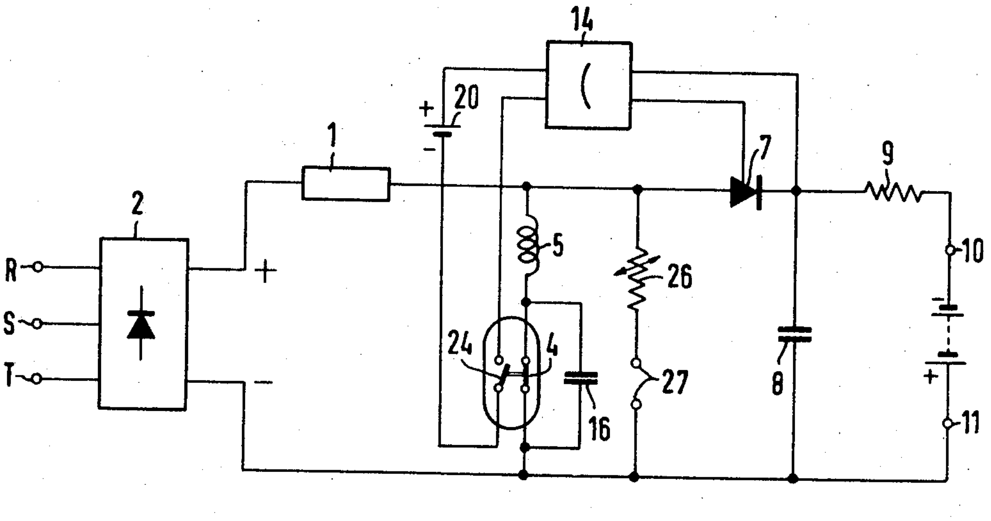

In order that the invention may be readily carried into effect, it will now be described with reference to the accompanying drawing, wherein:

FIG. 1 is a circuit diagram of an embodiment of the electrical switching device of the invention; and FIG. 2 is a circuit diagram of a modification of the embodiment of FIG. 1.

In the figures, the same components are identified by the same reference numerals.

The electrical switching device of the invention functions as a high speed DC circuit breaker. A DC load 1 is energized by a three phase current source having phases R, S and T, via a rectifier 2. A load circuit 3 includes a vacuum switch 4 and an inductor, inductance or choke winding 5 connected in series circuit arrangement with said vacuum switch.

A non-linear resistor 6 is connected in parallel with the vacuum switch 4, and more specifically, with the series circuit arrangement of said vacuum switch and the inductor 5. The non-linear resistor 6 may be a Varistor, a Zener diode or an avalanche diode, for example. The non-linear resistor 6 may also comprise a selenium rectifier connected in reverse direction.

An electronic switch 7 is connected in series circuit arrangement with a capacitor 8. The electronic switch may comprise a controlled rectifier, thyristor, or the like. The controlled rectifier 7 may comprise a group of controlled rectifiers. The controlled rectifier 7 may be replaced by a controlled switching path such as, for example, a controlled gas discharge path, or a contact. The series circuit arrangement of the controlled rectifier 7 and the capacitor 8 is connected in parallel with the vacuum switch 4, or more specifically, with the series circuit arrangement of said vacuum switch and the inductor 5, and is also connected in parallel with the non-linear resistor.

A DC voltage source having terminals 10 and 11 is connected to the capacitor 8 via a resistor 9. The DC voltage source 10, 11 recharges the capacitor 8. The polarity of the DC voltage source 10, 11 is selected so that the capacitor 8 has a charging voltage which supplies a current opposite to the current through the vacuum switch 4, or the arc current thereof, to said vacuum switch when the controlled rectifier 7 is fired or switched to its conductive condition.

The controlled rectifier 7 is switched to its conductive condition or fired by the light arc voltage occurring at the vacuum switch 4 when the contacts of said vacuum switch are opened. The arc voltage of the vacuum switch 4 is applied to the control electrode or grid of the controlled rectifier 7 via electrical conductors 12 and 13. Thus, the electrical conductor 12 is connected from one end of the vacuum switch 4 to the cathode of the controlled rectifier 7 and the electrical conductor 13 is connected from the other end of said vacuum switch to the control electrode of said controlled rectifier. In the modification of FIG. 2, the voltage occurring at auxiliary contacts 24 of the vacuum switch 4 is utilized to fire the controlled rectifier 7 instead of the arc voltage of said vacuum switch. A delay component, member or circuit 14 is connected to the conductors 12 and 13 and interposed between the vacuum switch 4 and the controlled rectifier 7. The delay component 14 functions to selectively delay the firing pulse supplied to the controlled rectifier 7.

The load circuit 3 is assumed to be inductively loaded. The circuit 3 is disconnected by opening the contacts of the vacuum switch 4. When the contacts of the vacuum switch 4 are opened, an arc is developed across said contacts, in a known manner. The arc voltage is utilized to fire the controlled rectifier 7. When the controlled rectifier 7 is fired, or switched to its conductive condition, the capacitor 8 supplies a current to the vacuum switch 4 which is opposite in direction to the current in the load circuit 3.

The current supplied by the capacitor 8 to the vacuum switch 4 permits the control of the zero passage of the current at the contacts of said vacuum switch and thereby interrupts the arc by force. The load current flowing through the vacuum switch 4 is commutated to the non-linear resistor 6. As a result of the current commutation, there are no voltage peaks at the vacuum switch 4 due to the inductive load 1.

An auxiliary switch is connected between the vacuum switch 4 and the non-linear resistor 6 and the series circuit arrangement of the controlled rectifier 7 and capacitor 8. The auxiliary switch 15 is utilized to disconnect the residual current flowing through the non-linear resistor 6. The auxiliary switch 15 is utilized to interrupt the circuit between the vacuum switch 4 and the non-linear resistor 6, the controlled rectifier 7 and the capacitor 8. Since only a small current is switched via the auxiliary switch 15, said auxiliary switch may comprise any suitable conventional switch.

The disconnection of the residual current may create a problem at high voltages. In such a case, as shown in the modification of FIG. 2, the non-linear resistor 6 may be replaced by a surge diverter. The surge diverter may comprise any suitable known surge converter such as, for example, a non-linear or voltage dependent resistor 26 and a spark gap 27 connected in series circuit arrangement with each other. The spark gap 27 is provided with magnetic control or blowing means (not shown in FIG. 2).

The firing pulse for the controlled rectifier 7 is delayed in time by the delay member 14 in order to insure that said controlled rectifier will fire only when the contact distance in the vacuum switch 4 is so great that the switching path will have dielectric strength after the zero passage of the current. This may be effected by any suitable known delay component, member or circuit which has an adjustable delay time between approximately 0.1 and 3.0 milliseconds. The delay component permits the attainment of a high switching speed, so that the switching cycle is optimized.

The inductor, inductance or choke winding 5 may comprise a saturable reactor. The inductor 5 functions to reduce the slope or steepness of the current in the vacuum switch 4 during the zero passage of the current. The switching path is thus rapidly deionized after the zero passage of the current. The vacuum switch 4 is preferably provided with an additional capacitor 16 connected in shunt therewith. The additional capacitor 16 decreases the slope, steepness or rate of increase of the voltage which again builds up at the vacuum switch 4.

The electrical switching device of the invention interrupts inductive load current circuits having high current density and high voltage. The electrical switching device of the invention is extremely simple in structure and uses very few components and is of very high operating reliability.

The modification of FIG. 2 is the same as the embodiment of FIG. 1, except that the vacuum switch 4 of FIG. 2 is provided with auxiliary contacts 24 and the non-linear resistor 6 of the embodiment of FIG. 1 is replaced in FIG. 2 by the surge diverter 26, 27. An additional DC voltage source 20 is connected in the electrical conductor between the auxiliary contacts 24 of the vacuum switch 4 and the delay component 14 in the modification of FIG. 2. The auxiliary switch 15 is not included in the modification of FIG. 2.

The disclosed embodiment of the electrical switching device of the invention functions as a high speed DC circuit breaker which may be utilized to disconnect alternating currents. The electrical switching device of the invention functions to prevent excess voltages during inductive loading. A rectifier 17 may be connected in antiparallel with the controlled rectifier 7, as shown in the embodiment of FIG. 1, in order to disconnect alternating currents. The rectifier 17 may comprise a suitable known diode. The controlled rectifier 7 and the antiparallel-connected diode 17 may be replaced by a double-path thyristor or a controllable switching path. A double-path thyristor may comprise a Diac, produced by the General Electric Company.

If, after the firing of the controlled rectifier 7, the current in the vacuum switch 4 flows in the same direction as the current supplied from the capacitor 8, the charge of said capacitor is first reversed. As the current swings back via the diode 17, it forces interruption of the load current at the contacts of the vacuum switch 4. The inductor 5 and the capacitor 8 form a resonant circuit. The diode 17 may also be included in a high speed circuit breaker for interrupting a direct current. The electrical switching device of the invention is then independent of the polarity of the charging voltage applied to the capacitor 8.

While the invention has been described by means of specific examples and in specific embodiments, we do not wish to be limited thereto, for obvious modifications will occur to those skilled in the art without departing from the spirit and scope of the invention.

We claim:

1. An electrical switching device, comprising
a vacuum switch having contacts;
an electronic switch connected in series circuit arrangement with a capacitor, said series circuit arrangement being connected in parallel with the vacuum switch;
control means coupled between the vacuum switch and the electronic switch vor controlling said electronic switch in conductive condition in a manner whereby said electronic switch is switched to its conductive condition after the contacts of said vacuum switch are opened thereby providing a current path from said capacitor to said vacuum switch via said electronic switch as a result of which the arc is quenched in the vacuum switch;
a non-linear resistor connected in parallel with the series circuit arrangement, said non-linear resistor being apportioned so that it takes over the load current after the contacts of the vacuum switch are opened; and
an inductor connected to the vacuum switch for limiting the slope of the current.

2. An electrical switching device as claimed in claim 1, wherein the electronic switch comprises a controlled rectifier having a control electrode and the control means comprises electronic delay means for adjusting the time for the interruption of the arc and electrically conductive means connecting the contacts of the vacuum switch to the control electrode of the controlled rectifier via said delay means.

3. An electrical switching device as claimed in claim 1, further comprising an auxiliary switch interposed between the vacuum switch and said series circuit arrangement and said non-linear resistor for selectively disconnecting said series circuit arrangement and said non-linear resistor from said vacuum switch.

4. An electrical switching device as claimed in claim 1, wherein the inductor is connected in series with the vacuum switch.

5. An electrical switching device as claimed in claim 1, wherein the electronic switch comprises a controlled rectifier and further comprising a rectifier connected in antiparallel with said controlled rectifier.

6. An electrical switching device, comprising
a vacuum switch having contacts;
an electronic switch connected in series circuit arrangement with a capacitor, said series circuit arrangement being connected in parallel with the vacuum switch;
control means coupled between the vacuum switch and the electronic switch for controlling said electronic switch in conductive condition in a manner whereby said electronic switch is switched to its conductive condition after the contacts of said vacuum switch are opened thereby providing a current path from said capacitor to said vacuum switch via said electronic switch as a result of which the arc is quenched in the vacuum switch;
a surge diverter connected in parallel with the series circuit arrangement, said surge diverter being apportioned so that it takes over the load current after the contacts of the vacuum switch are opened; and
an inductor connected to the vacuum switch for limiting the slope of the current.

* * * * *